United States Patent [19]

Vinson et al.

[11] Patent Number: 5,635,028

[45] Date of Patent: Jun. 3, 1997

[54] PROCESS FOR MAKING SOFT CREPED TISSUE PAPER AND PRODUCT THEREFROM

[75] Inventors: Kenneth D. Vinson; Paul T. Weisman, both of Cincinnati; Dean V. Phan, West Chester, all of Ohio

[73] Assignee: The Procter & Gamble Company, Cincinnati, Ohio

[21] Appl. No.: 424,835

[22] Filed: Apr. 19, 1995

[51] Int. Cl.$^6$ .................................................. D21H 21/22
[52] U.S. Cl. ........................ 162/111; 162/112; 162/113; 162/123; 162/125; 162/127; 162/129; 162/130; 162/158; 162/175; 162/177
[58] Field of Search .............................. 162/112, 111, 162/113, 158, 177, 175, 183, 123, 125, 127, 129, 130, 132, 133, 164.1, 164.3, 164.6, 168.1

[56] References Cited

U.S. PATENT DOCUMENTS

| | | | |
|---|---|---|---|
| 2,683,087 | 7/1954 | Reynolds, Jr. | 162/158 |
| 2,683,088 | 7/1954 | Reynolds, Jr. | 162/158 |
| 3,301,746 | 1/1967 | Sanford et al. | 162/113 |
| 3,554,863 | 1/1971 | Hervey et al. | 162/158 |
| 3,755,220 | 8/1973 | Freimark et al. | 260/17.3 |
| 3,817,827 | 6/1974 | Benz | 162/113 |
| 3,844,880 | 10/1974 | Meisel, Jr. et al. | 162/169 |
| 3,974,025 | 8/1976 | Ayers | 162/113 |
| 3,994,771 | 11/1976 | Morgan, Jr. et al. | 162/113 |
| 4,144,122 | 3/1979 | Emanuelsson et al. | 162/158 |
| 4,158,594 | 6/1979 | Becker et al. | 162/112 |
| 4,191,609 | 3/1980 | Trokhan | 162/113 |
| 4,300,981 | 11/1981 | Carstens | 162/109 |
| 4,303,471 | 12/1981 | Laursen | 162/158 |
| 4,351,699 | 9/1982 | Osborn, III | 162/112 |
| 4,377,543 | 3/1983 | Strohbeen et al. | 264/120 |
| 4,425,186 | 1/1984 | May et al. | 162/158 |
| 4,432,833 | 2/1984 | Breese | 162/158 |
| 4,441,962 | 4/1984 | Osborn, III | 162/111 |
| 4,447,294 | 5/1984 | Osborn, III | 162/158 |
| 4,529,480 | 7/1985 | Trokhan | 162/109 |
| 4,637,859 | 1/1987 | Trokhan | 162/109 |
| 4,795,530 | 1/1989 | Soerens et al. | 162/111 |
| 4,853,086 | 8/1989 | Graef | 162/157.6 |
| 4,940,513 | 7/1990 | Spendel | 162/112 |
| 4,959,125 | 9/1990 | Spendel | 162/158 |
| 4,981,557 | 1/1991 | Bjorkquist | 162/168.2 |
| 5,217,576 | 6/1993 | Phan | 162/158 |
| 5,223,096 | 6/1993 | Phan et al. | 162/158 |
| 5,240,562 | 8/1993 | Phan et al. | 162/158 |
| 5,262,007 | 11/1993 | Phan et al. | 162/158 |
| 5,264,082 | 11/1993 | Phan et al. | 162/158 |
| 5,279,767 | 1/1994 | Phan et al. | 252/357 |
| 5,312,522 | 5/1994 | Phan et al. | 162/111 |
| 5,397,435 | 3/1995 | Ostendorf et al. | 162/112 |
| 5,405,501 | 4/1995 | Phan et al. | 162/127 |
| 5,415,737 | 5/1995 | Phan et al. | 162/111 |
| 5,427,696 | 6/1995 | Phan et al. | 252/8.6 |
| 5,437,766 | 8/1995 | Van Phan et al. | 162/127 |

FOREIGN PATENT DOCUMENTS

| | | |
|---|---|---|
| 61-308312 | 7/1988 | Japan. |
| 4-100995 | 4/1992 | Japan. |

OTHER PUBLICATIONS

"Applications of Armak Quaternary Ammonium Salts", Bulletin 76–17, Armak Co., (1977).

Primary Examiner—Peter Chin
Attorney, Agent, or Firm—Bart S. Hersko; E. Kelly Linman; Jacobus C. Rasser

[57] ABSTRACT

Soft creped tissue paper products comprising papermaking fibers and a crepe facilitating composition are disclosed. The crepe facilitating composition comprises a bonding inhibitor, a cationic starch and a carboxymethyl cellulose. Preferably, the bonding inhibitor is a quaternary ammonium compound. The use of a bonding inhibitor, a cationic starch and a carboxymethyl cellulose results in a creped tissue paper that is both strong and soft. A creped papermaking process comprising the addition of the crepe facilitating composition is also disclosed. The crepe facilitating composition offers the potential to improve production capacity.

29 Claims, 2 Drawing Sheets

Fig. 1

PROCESS FOR MAKING SOFT CREPED TISSUE PAPER AND PRODUCT THEREFROM

FIELD OF THE INVENTION

This invention relates to creped tissue paper products and papermaking processes. More particularly, it relates to creped tissue paper made by the dry creped process wherein an embryonic web is formed on a Fourdrinier, freed of excess water, adhesively secured while in a semi-dry condition to a Yankee dryer, and creped from the Yankee after reaching an essentially dry condition. The creped tissue paper products can be used for strong, soft paper products such as toilet tissue and facial tissue products.

BACKGROUND OF THE INVENTION

Single-use sanitary paper tissue products are widely used. Such items are commercially offered in formats tailored for a variety of uses such as facial tissues, toilet tissues and kitchen roll towels. The formats, i.e. basis weight, thickness, strength, sheet size, dispensing medium, etc. of these products often differ widely, but they are linked by the common process by which they are usually produced, the so-called dry creping process. They are further linked by the common consumer desire for a pleasing tactile impression, i.e. softness.

Softness is the tactile sensation perceived by the consumer as he/she holds a particular product, rubs it across his/her skin, or crumples it within his/her hand. This tactile sensation is provided by a combination of several physical properties. One of the most important physical properties related to softness is generally considered by those skilled in the art to be the stiffness of the paper web from which the product is made. Stiffness, in turn, is usually considered to be directly dependent on the strength of the web.

Strength is the ability of the product, and its constituent webs, to maintain physical integrity and to resist tearing, bursting, and shredding under use conditions.

Papermaking in general and specifically creped tissue paper manufacture is an old art. As such, it has had many years to develop to satisfy continuing consumer desires for more and more consumption at greater and greater economy. This long history has permitted papermaking machines to grow larger in size and faster in speed. The size and scale of these processes now often limit the ability of the product designer to effectively meet the before mentioned consumer need for tactile impression and product strength without sacrificing some of the gains made in machine capacity. Those skilled in the art will recognize that this is because many of the factors known to positively affect tactile impression of the product tend to be adversely affected by size and particularly speed of the papermaking and creping process.

Research and development efforts have been directed toward the improvement of softness or at least maintaining the softness quality while at the same time, continuing to increase the production capacity of papermaking units.

Creping is a means of mechanically compacting paper in the machine direction. The result is an increase in basis weight (mass per unit area) as well as dramatic changes in many physical properties, particularly when measured in the machine direction. Creping is generally accomplished with a flexible blade, a so-called doctor blade, against a Yankee dryer in an on machine operation.

In creped paper technology, reducing the percent crepe (the amount by which the paper web is foreshortened in creping) of the creped papermaking process allows the basis weight of the web traveling through the process up to the creping blade to be increased without increasing the basis weight of the final product. Papermaking generally increases in efficiency as basis weight is increased; therefore, it is desirable to use as low percent crepe as otherwise permitted by the process and the product.

A Yankee dryer is a large diameter, generally 8–20 foot drum which is designed to be pressurized with steam to provide a hot surface for completing the drying of papermaking webs at the end of the papermaking process. The paper web which is first formed on a foraminous forming carrier, such as a Fourdrinier wire, where it is freed of the copious water needed to disperse the fibrous slurry is generally transferred to a felt or fabric in a so-called press section where de-watering is continued either by mechanically compacting the paper or by some other de-watering method such as through-drying with hot air, before finally being transferred in the semi-dry condition to the surface of the Yankee for the drying to be completed.

The wet web has a natural adhesion to the Yankee dryer surface. One skilled in the art will recognize that the adhesion results primarily from the action of the water and the coating on the Yankee, the coating comprising the soluble or residual components of the papermaking composition which build up on the dryer surface with continued operation.

Often, the adhesion achieved of the semi-dry web to the Yankee arising from this natural coating is insufficient. The result is that the product is marred by areas of skipped crepe giving poor product appearance and performance and the operation is plagued by low tension in the sheet causing weaving and fluttering making it difficult to wind a wrinkle-free roll neatly enough to be utilized in subsequent operations needed to convert the product into its finished form.

Those skilled in the art will recognize that the difficulty in achieving sufficient adhesion of the traveling semi-dry web to the Yankee will be more pronounced when the moisture content of the web is low. Another factor is the fraction of the web surface which is adhered to the Yankee surface. In particular, the papermaking process for making pattern densified paper such as described by Sanford and Sisson in U.S. Pat. No. 3,301,746 issued on Jan. 31, 1967 and its progeny are particularly prone to the before-described shortfall in natural adhesion. The '746 process and its progeny create a relatively low moisture content web at transfer and only adhere a fraction of the surface of the web to the Yankee dryer.

When the natural adhesion is too low, it is sometimes supplemented with the addition of adhesion promoters. Such adhesion promoters can be added to the papermaking composition prior to reaching the Fourdrinier wire, or they can be added by spraying them on the surface of the web or on the surface of the Yankee.

One example of a supplementary adhesion promoter recommended for adding to the papermaking composition is provided by Latimer, U.S. Pat. No. 4,406,737, wherein described is a method of creping paper comprising incorporating in a paper web or paper pulp subsequently formed into a web of paper, a cationic water soluble addition polymer.

An example of a composition recommended for spraying onto the surface of the web or on the Yankee is provided by Bates, U.S. Pat. No. 3,926,716, wherein described is a process for manufacturing a soft and absorbent tissue paper web comprising applying an aqueous polyvinyl alcohol solution to cause adherence of the web to a rotating cylindrical surface.

Adhesion aids of this type are effective in raising the level of adhesion to the dryer, which can be vital to the process of making strong and soft creped tissue paper, especially of the pattern densified type. However, they do not have any appreciable positive effect in regards to allowing a reduction in percent crepe. Indeed, the improvement in adhesion often causes the tension in the web between the creping blade and the wind-up reel to be tightened making it necessary to increase the percent crepe to prevent frequent breaks due to over-tensioning when these materials are used.

Chemical debonding agents have been disclosed in various references such as U.S. Pat. No. 3,554,862, issued to Hervey et al. on Jan. 12, 1971. These materials include quaternary ammonium salts such as cocotrimethylammonium chloride, oleyltrimethylammonium chloride, di(hydrogenated)tallow dimethyl ammonium chloride and stearyltrimethyl ammonium chloride.

Shaw, in U.S. Pat. No. 3,821,068, issued Jun. 28, 1974, also teaches that chemical debonders can be used to reduce the stiffness, and thus enhance the softness, of a tissue paper web.

Emanuelsson et al., in U.S. Pat. No. 4,144,122, issued Mar. 13, 1979, teach the use of complex quaternary ammonium compounds such as bis(alkoxy(2-hydroxy)propylene) quaternary ammonium chlorides to soften webs.

Armak Company, of Chicago, Ill., in their bulletin 76-17 (1977) disclose the use of dimethyl di(hydrogenated)tallow ammonium chloride in combination with fatty acid esters of polyoxyethylene glycols to impart both softness and absorbency to tissue paper webs.

Conventional quaternary ammonium compounds such as the well known dialkyl dimethyl ammonium salts (e.g. ditallow dimethyl ammonium chloride, ditallow dimethyl ammonium methyl sulfate, di(hydrogenated)tallow dimethyl ammonium chloride etc. ...) are effective chemical bonding inhibiting agents.

While promoting the softness of webs, these materials are all expected to have adverse effects on the paper product, most particularly, a reduction in strength of paper webs containing them because of their tendency to inhibit the formation of fiber to fiber bonds.

Becker et al. in U.S. Pat. No. 4,158,594, issued Jan. 19, 1979, describe a method they contend will form a strong, soft, fibrous sheet. More specifically, they teach that the strength of a tissue paper web (which may have been softened by the addition of chemical debonding agents) can be enhanced by adhering, during processing, one surface of the web to a creping surface in a fine patterned arrangement by a bonding material (such as an acrylic latex rubber emulsion, a water soluble resin, or an elastomeric bonding material) which has been adhered to one surface of the web and to the creping surface in the fine patterned arrangement, and creping the web from the creping surface to form a sheet material.

The use of resins to enhance the strength of a paper web is widely known. For example, Westfelt described a number of such materials and discussed their chemistry in Cellulose Chemistry and Technology, Volume 13, at pages 813–825 (1979). Freimark et al. in U.S. Pat. No. 3,755,220 issued Aug. 28, 1973 mention that certain chemical additives known as debonding agents interfere with the natural fiber-to-fiber bonding that occurs during sheet formation in paper making processes. This reduction in bonding leads to a softer, or less harsh, sheet of paper. Freimark et al. go on to teach the use of wet strength resins in conjunction with the use of debonding agents to off-set the undesirable effects of the debonding agents.

Unfortunately, the amount of strength loss that can be offset in these ways is limited. One reason for this is because the effects of strength resins taper off rapidly in low density tissue structures as their substantivity is spent.

In addition, the addition of strength resins to counteract the deleterious effects of bonding inhibitors does not necessarily overcome other side effects of debonders on the process, most notably a decrease in adhesion to the Yankee dryer which causes the before-mentioned operational difficulties. Accordingly, the use of chemical bonding inhibitors of the beforementioned types have been relegated to relatively minor levels of incorporation and thus relatively minor influence on the product.

It is therefore an object of this invention to provide a papermaking composition capable of being converted into creped paper products that are both strong and soft.

It is a further object of this invention to provide a papermaking composition which improves the operating efficiency of the dry creping process.

These and other objects are obtained using the present invention, as will become readily apparent from a reading of the following disclosure.

SUMMARY OF THE INVENTION

The present invention provides strong and soft creped tissue paper products and a process for producing the same by use of a crepe facilitating composition. Briefly, the strong and soft creped tissue paper comprises:

a) papermaking fibers; and b) a crepe facilitating composition comprising:
   i) from about 0.02% to about 1.0% by weight, of a bonding inhibitor, based on the dry weight of the papermaking fibers;
   ii) from about 0.02% to about 0.5% by weight, of a water soluble carboxymethyl cellulose, based on the dry weight of the papermaking fibers; and
   iii) from about 0.05% to about 3.0% by weight, of a cationic starch, based on the dry weight of the papermaking fibers;

wherein said bonding inhibitor is preferably present in a ratio relative to the carboxymethyl cellulose of about 1:5 to about 5:1, more preferably, said bonding inhibitor is present in a ratio relative to the carboxymethyl cellulose of about 1:2 to about 2:1.

Preferably, the bonding inhibitor of the present invention is a quaternary ammonium compound, more preferably quaternary ammonium compounds having the formula:

wherein m is 1 to 3;

each $R_1$ is a $C_1$–$C_8$ alkyl group, hydroxyalkyl group, hydrocarbyl or substituted hydrocarbyl group, alkoxylated group, benzyl group, or mixtures thereof;

each $R_2$ is a $C_9$–$C_{41}$ alkyl group, hydroxyalkyl group, hydrocarbyl or substituted hydrocarbyl group, alkoxylated group, benzyl group, or mixtures thereof; and $X^-$ is any softener-compatible anion.

Examples of quaternary ammonium compounds suitable for use in the present invention include the well-known dialkyldimethylammonium salts such as ditallow dimethyl ammonium chloride, ditallow dimethylammonium methyl sulfate, di(hydrogenated)tallow dimethyl ammonium chloride; with di(hydrogenated)tallow dimethyl ammonium methyl sulfate being preferred. This particular material is available commercially from Witco Company Inc. of Dublin, Ohio under the tradename "Varisoft® 137".

Preferably the quaternary ammonium bonding inhibitor is present in a weight ratio of from about 1:5 to about 5:1 compared to the carboxymethyl cellulose, more preferably the quaternary ammonium bonding inhibitor is present in a weight ratio of from about 1:2 to about 2:1 compared to the carboxymethyl cellulose.

Briefly, the process for making the strong and soft creped tissue paper webs of the present invention comprises the steps of:

a) forming an aqueous slurry of paper making fibers;

b) adding a crepe facilitating composition comprising:
  i) from about 0.02% to about 1.0% by weight, of a bonding inhibitor, based on the dry weight of the papermaking fibers;
  ii) from about 0.02% to about 0.5% by weight, of a watersoluble carboxymethyl cellulose, based on the dry weight of the papermaking fibers; and
  iii) from about 0.05% to about 3.0% by weight, of a cationic starch, based on the dry weight of the papermaking fibers;
  wherein said bonding inhibitor is present in a ratio relative to the carboxymethyl cellulose of about 1:5 to about 5:1;

c) depositing the papermaking fibers on a foraminous surface so that the excess water used to form the dispersion is removed forming an embryonic web;

d) transferring the embryonic web to a carrier surface upon which the water removal continues forming a semi-dry web, said carrier surface being selected from the group consisting of papermaking felts and forming fabrics;

e) transferring the semi-dry web to the surface of a Yankee dryer upon which the drying is continued until the web reaches a substantially dry condition;

f) removal of the dried web from the Yankee dryer by means of a creping blade; and g) winding the creped web on a reel.

It has been discovered that the constituents of the crepe facilitating compound are optimally added separately to the papermaking slurry while in dilute suspension before the fibers are deposited.

It has also been discovered that the performance of the creping facilitating composition is optimum if the chemical bonding inhibitor is added before the cationic starch.

All percentages, ratios and proportions herein are by weight unless otherwise specified.

The present invention is described in more detail below.

DETAILED DESCRIPTION OF THE INVENTION

While this specification concludes with claims particularly pointing out and distinctly claiming the subject matter regarded as the invention, it is believed that the invention can be better understood from a reading of the following detailed description and of the appended examples.

As used herein, the term "comprising" means that the various components, ingredients, or steps, can be conjointly employed in practicing the present invention. Accordingly, the term "comprising" encompasses the more restrictive terms "consisting essentially of" and "consisting of."

As used herein, the term "crepe facilitating compounds" refers to one or more components added to a papermaking furnish while the furnish is in dilute slurry form or subsequently to the embryonic web to beneficiate the creping process or resultant product by altering adhesion to the Yankee dryer, altering the stable percent (%) crepe in the process, or improving the softness of the resultant product.

As used herein, the term "water soluble" refers to materials that are soluble in water to at least 3% at 25° C.

As used herein, the terms "tissue paper web, paper web, web, paper sheet and paper product" all refer to sheets of paper made by a process comprising the steps of forming an aqueous papermaking furnish, depositing this furnish on a foraminous surface, such as a Fourdrinier wire, and removing the water from the furnish as by gravity or vacuum-assisted drainage, with or without pressing, and by evaporation, comprising the final steps of adhering the sheet in a semi-dry condition to the surface of a Yankee dryer, completing the water removal by evaporation to an essentially dry state, removal of the web from the Yankee dryer by means of a flexible creping blade, and winding the resultant sheet onto a reel.

As used herein, an "aqueous paper making furnish" is an aqueous slurry of paper making fibers optionally including modifying chemicals as described hereinafter.

The terms "multi-layered tissue paper web, multi-layered paper web, multi-layered web, multi-layered paper sheet and multi-layered paper product" are all used interchangeably in the art to refer to sheets of paper prepared from two or more layers of aqueous paper making furnish which are preferably comprised of different fiber types, the fibers typically being relatively long softwood and relatively short hardwood fibers as used in tissue paper making. The layers are preferably formed from the deposition of separate streams of dilute fiber slurries upon one or more endless foraminous surfaces. If the individual layers are initially formed on separate foraminous surfaces, the layers can be subsequently combined when wet to form a multi-layered tissue paper web.

As used herein, the term "multi-ply tissue product" means that it is comprised of more than one ply of creped tissue. The plies of a multi-ply can be substantially homogeneous in nature or they can be multi-layered tissue paper webs.

As used herein, the term "percent (%) crepe" is defined as the difference in speed between the Yankee dryer and the wind-up reel as a percentage of the Yankee speed in a creped papermaking process. In other words, percent crepe is the net percentage by which the traveling web is foreshortened relative to its length while on the Yankee dryer.

As used herein, the term impact angle refers to the angle formed between the creping blade surface and the tangent of the Yankee dryer at the point of contact with the creping blade. In practice, the papermaker wishes to minimize the impact angle, but is constrained by the tendency of the web to attempt to move past the creping blade. Such tendency often causes the web to tear and is sometimes referred to as "plugging" at the doctor blade.

As used herein, the term "bonding inhibitor" is an additive which acts to retard the natural fiber to fiber bonding which takes place in a papermaking web as it is dried in a papermaking process.

The first step in the process of this invention is the forming of a furnish of aqueous papermaking fibers (hereinafter sometimes referred to as wood pulp).

It is anticipated that wood pulp in all its varieties will normally comprise the paper making fibers used in this invention. However, other cellulose fibrous pulps, such as cotton linters, bagasse, rayon, etc., can be used and none are disclaimed. Wood pulps useful herein include chemical pulps such as, sulfite and sulfate (sometimes called Kraft) pulps as well as mechanical pulps including for example, ground wood, ThermoMechanical Pulp (TMP) and Chemi-ThermoMechanical Pulp (CTMP). Pulps derived from both deciduous and coniferous trees can be used.

Both hardwood pulps and softwood pulps as well as blends of the two may be employed as papermaking fibers for the tissue paper of the present invention. The term "hardwood pulps" as used herein refers to fibrous pulp derived from the woody substance of deciduous trees (angiosperms), whereas "softwood pulps" are fibrous pulps derived from the woody substance of coniferous trees (gymnosperms). Blends of hardwood Kraft pulps, especially eucalyptus, and northern softwood Kraft (NSK) pulps are particularly suitable for making the tissue webs of the present invention. Also comprising the present invention, layered tissue webs wherein, most preferably, hardwood pulps such as eucalyptus are used for outer layer(s), whereas northern softwood Kraft pulps are used for the inner layer(s). Also applicable to the present invention are fibers derived from recycled paper, which may contain any or all of the above categories of fibers.

Crepe Facilitating Composition

An essential component of the present invention is the crepe facilitating composition. The crepe facilitating composition comprises a bonding inhibitor, carboxymethyl cellulose and cationic starch.

Preferably the bonding inhibitor is a quaternary ammonium compound and is present in the weight ratio of from about 1:5 to about 5:1 relative to the carboxymethyl cellulose. More preferably the bonding inhibitor is a quaternary ammonium compound and is present in the weight ratio of from about 1:2 to about 2:1 relative to the carboxymethyl cellulose.

A. Bonding Inhibitor

The crepe facilitating composition contains as an essential component a bonding inhibitor. The bonding inhibitor is present in an amount of 0.02% to about 1.0% based on the dry weight of the papermaking fibers of the furnish and more preferably 0.1% to 0.5%. Preferred are quaternary ammonium compounds, more preferably quaternary ammonium compounds having the formula:

wherein m is 1 to 3;

each $R_1$ is a $C_1$–$C_8$ alkyl group, hydroxyalkyl group, hydrocarbyl or substituted hydrocarbyl group, alkoxylated group, benzyl group, or mixtures thereof;

each $R_2$ is a $C_9$–$C_{41}$ alkyl group, hydroxyalkyl group, hydrocarbyl or substituted hydrocarbyl group, alkoxylated group, benzyl group, or mixtures thereof; and $X^-$ is any softener-compatible anion.

As discussed in Swern, Ed. in Bailey's Industrial Oil and Fat Products, Third Edition, John Wiley and Sons (New York 1964), tallow is a naturally occurring material having a variable composition. Table 6.13 in the above-identified reference edited by Swern indicates that typically 78% or more of the fatty acids of tallow contain 16 or 18 carbon atoms. Typically, half of the fatty acids present in tallow are unsaturated, primarily in the form of oleic acid. Synthetic as well as natural "tallows" fall within the scope of the present invention. Preferably, each $R_2$ is $C_{16}$–$C_{18}$ alkyl, most preferably each $R_2$ is straight-chain $C_{18}$ alkyl. Preferably, each $R_1$ is methyl, $X^-$ is chloride or methyl sulfate and m is 2. Optionally, the $R_2$ substituent can be derived from vegetable oil sources.

Examples of quaternary ammonium compounds suitable for use in the present invention include the well-known dialkyldimethylammonium salts such as ditallow dimethyl ammonium chloride, ditallow dimethylammonium methyl sulfate, di(hydrogenated)tallow dimethyl ammonium chloride; with di(hydrogenated)tallow dimethyl ammonium methyl sulfate being preferred. This particular material is available commercially from Witco Company Inc. of Dublin, Ohio under the tradename "Varisoft® 137".

Vegetable oil based variations of the quaternary ammonium compound can also be used, and are meant to fall within the scope of the present invention. These compounds have the same formulas as described above wherein the $R_2$ substituent comprises a $C_{11}$–$C_{23}$, hydrocarbyl group, or substituted hydrocarbyl group derived from vegetable oil sources. Preferably, the majority of $R_2$ comprises fatty aliphatic groups containing at least 90% $C_{18}$–$C_{24}$ chainlength. More preferably, the majority of the $R_2$ substituents are selected from the group consisting of fatty aliphatic groups containing at least 90% $C_{18}$, $C_{22}$ and mixtures thereof.

Specific examples of preferred vegetable oil based variations of the quaternary ammonium compound suitable for use in the present invention include compounds having the formulas:

and

These compounds can be considered to be variations of the di(oleyl)dimethyl ammonium chloride (DODMAC) (i.e., di(octadec-z-9-enyl)dimethyl ammonium chloride) and di(erucyl)dimethyl ammonium chloride (DEDMAC) (i.e., di(docos-z-13-enyl)dimethyl ammonium chloride) respectively. It's to be understood that because the oleyl and the erucyl fatty acyl groups are derived from naturally occurring vegetable oils (e.g., olive oil, rapeseed oil etc . . . ), that minor amounts of other fatty aliphatic groups may also be present.

B. Carboxymethyl Cellulose

The crepe facilitating composition contains as an essential component a carboxymethyl cellulose. The present invention contains from about 0.01% to about 1.0% and more preferably from about 0.02% to about 0.5% carboxymethyl cellulose.

The term "carboxymethyl cellulose" as used herein refers to carboxymethyl cellulose (CMC) or its additionally substituted derivatives such as carboxymethyl methylcellulose (CMMC), carboxymethyl hydroxyethylcellulsoe (CMHEC), and carboxymethyl hydroxypropylcellulose (CMHPC). If additional substituents are used, it is preferable that they be methyl or hydroxyalkyl groups, the latter functionality preferably containing 2 to 3 carbon atoms.

Carboxymethyl cellulose useful in the present invention is water soluble and has a degree of substitution up to the theoretical limit of 3.0, but is preferably in the range from about 0.3 to about 1.4 carboxymethyl substituents per anhydroglucose unit of cellulose.

The Molecular Weight of the carboxymethyl cellulose useful for the present invention can range from about 10,000 to about 1,000,000, but preferably ranges from about 90,000 to about 700,000.

Suitable carboxymethyl cellulose can be obtained from Hercules Incorporated, Wilmington Del. Hercules CMC-7MT® is a suitable grade.

Before adding the carboxymethyl cellulose to the papermaking furnish used to make tissue paper webs according to the present invention, it is preferable to create an aqueous solution of the carboxymethyl cellulose, preferably ranging from about 0.1% to about 5.0% CMC.

C. Cationic Starch

The crepe facilitating composition contains as an essential component a cationic starch. The cationic starch is present in an amount of 0.05% to about 3.0% based on the dry fiber weight of the papermaking fibers, and more preferably from 0.1% to about 2.0%.

As used herein the term "cationic starch" is defined as starch, as naturally derived, which has been further chemically modified to impart a cationic constituent moiety. Preferably the starch is derived from corn or potatoes, but can be derived from other sources such rice, wheat, or tapioca. Starch from waxy maize also known industrially as amioca starch is particularly preferred. Amioca starch differs from common dent corn starch in that it is entirely amylopectin, whereas common corn starch contains both amylopectin and amylose. Various unique characteristics of amioca starch are further described in "Amioca—The Starch from Waxy Corn", H. H. Schopmeyer, Food Industries, December 1945, pp. 106–108 (Vol. pp. 1476–1478). The starch can be in granular form, pre-gelatinized granular form, or dispersed form. The dispersed form is preferred. If in granular pre-gelatinized form, it need only be dispersed in cold water prior to its use, with the only pre-caution being to use equipment which overcomes any tendency to gel-block in forming the dispersion. Suitable dispersers known as eductors are common in the industry. If the starch is in granular form and has not be pre-gelatinized, it is necessary to cook the starch to induce swelling of the granules. Preferably, such starch granules are swollen, as by cooking, to a point just prior to dispersion of the starch granule. Such highly swollen starch granules shall be referred to as being "fully cooked". The conditions for dispersion in general can vary depending upon the size of the starch granules, the degree of crystallinity of the granules, and the amount of amylose present. Fully cooked amioca starch, for example, can be prepared by heating an aqueous slurry of about 4% consistency of starch granules at about 190° F. (about 88° C.) for between about 30 and about 40 minutes.

Cationic starches can be divided into the following general classifications: (1) tertiary aminoalkyl ethers, (2) onium starch ethers including quaternary amines, phosphonium, and sulfonium derivatives, (3) primary and secondary aminoalkyl starches, and (4) miscellaneous (e.g., imino starches). New cationic products continue to be developed, but the tertiary aminoalkyl ethers and quaternary ammonium alkyl ethers are the main commercial types. Preferably, the cationic starch has a degree of substitution ranging from about 0.01 to about 0.1 cationic substituent per anhydroglucose units of starch; the substituents preferably chosen from the above mentioned types. Suitable starches are produced by National Starch and Chemical Company, (Bridgewater, N.J.) under the tradename, RediBOND®. Grades with cationic moieties only such as RediBOND 5320® and RediBOND 5327® are suitable, and grades with additional anionic functionality such as RediBOND 2005® are also suitable.

The present invention is applicable to creped tissue paper in general, including but not limited to conventionally felt-pressed creped tissue paper; high bulk pattern densified creped tissue paper; and high bulk, uncompacted creped tissue paper.

Creped tissue paper webs suitable for the present invention have a basis weight of between 10 $g/m^2$ and about 65 $g/m^2$, and density of about 0.60 $g/cm^3$ or less. Preferably, basis weight will be below about 35 $g/m^2$ or less; and density will be about 0.30 $g/cm^3$ or less. Most preferably, density will be between 0.04 $g/cm^3$ and 0.20 $g/cm^3$.

The present invention is further applicable to multi-layered tissue paper webs. Tissue structures formed from layered paper webs are described in U.S. Pat. No. 3,994,771, Morgan, Jr. et al. issued Nov. 30, 1976, U.S. Pat. No. 4,300,981, Carstens, issued Nov. 17, 1981, U.S. Pat. No. 4,166,001, Dunning et al., issued Aug. 28, 1979, and European Patent Publication No. 0 61 3 979 A1, Edwards et al., published Sep. 7, 1994, all of which are incorporated herein by reference. The layers are preferably comprised of different fiber types, the fibers typically being relatively long softwood and relatively short hardwood fibers as used in multi-layered tissue paper making. Multi-layered tissue paper webs suitable for the present invention comprise at least two superposed layers, an inner layer and at least one outer layer contiguous with the inner layer. Preferably, the multi-layered tissue papers comprise three superposed layers, an inner or center layer, and two outer layers, with the inner layer located between the two outer layers. The two outer layers preferably comprise a primary filamentary constituent of about 60% or more by weight of relatively short paper making fibers having an average fiber between about 0.2 and about 1.5 mm. These short paper making fibers are typically hardwood fibers, preferably hardwood Kraft fibers, and most preferably derived from eucalyptus. The inner layer preferably comprises a primary filamentary constituent of about 60% or more by weight of relatively long paper making fibers having an average fiber length of least about 2.0 mm. These long paper making fibers are typically softwood fibers, preferably, northern softwood Kraft fibers. Preferably, the majority of the crepe facilitating composition of the present invention is contained in at least one of the outer layers of the multi-layered tissue paper web of the present invention. More preferably, the majority of the crepe facilitating composition of the present invention is contained in both of the outer layers.

The creped tissue paper products made from single-layered or multilayerd creped tissue paper webs can be of a single-ply or multi-ply construction.

The process for making the strong and soft creped tissue paper webs of the present invention comprises the steps of:
a) forming an aqueous slurry of paper making fibers;
b) adding a crepe facilitating composition comprising:
  i) from about 0.02% to about 1.0% by weight, of a bonding inhibitor, based on the dry weight of the papermaking fibers;
  ii) from about 0.02% to about 0.5% by weight, of a water soluble carboxymethyl cellulose, based on the dry weight of the papermaking fibers; and
  iii) from about 0.05% to about 3.0% by weight, of a cationic starch, based on the dry weight of the papermaking fibers;

wherein said bonding inhibitor is present in a ratio relative to the carboxymethyl cellulose of about 1:5 to about 5:1;

c) depositing the papermaking fibers on a foraminous surface so that the excess water used to form the dispersion is removed forming an embryonic web;

d) transferring the embryonic web to a carrier surface upon which the water removal continues forming a semi-dry web, said carder surface being selected from the group consisting of papermaking felts and forming fabrics;

e) transferring the semi-dry web to the surface of a Yankee dryer upon which the drying is continued until the web reaches a substantially dry condition;

f) removal of the dried web from the Yankee dryer by means of a creping blade; and g) winding the creped web on a reel.

In the process step of the present invention comprising the depositing the papermaking fibers on a foraminous surface, the equipment and methods are well known to those skilled in the art. In a typical process, a low consistency pulp furnish is provided in a pressurized headbox. The headbox has an opening for delivering a thin deposit of pulp furnish onto the Fourdrinier wire to form a wet web. The web is then typically dewatered to a fiber consistency of between about 7% and about 25% (total web weight basis) by vacuum dewatering.

In the process step of the present invention comprising the addition of the crepe facilitating composition; the bonding inhibitor, the carboxymethyl cellulose, and the cationic starch are preferably formed into aqueous solutions, diluted to a desired concentration and added to the aqueous slurry of paper making fibers, or furnish, in the wet end of the paper making machine at some suitable point ahead of the Fourdrinier wire or sheet forming stage. However, applications of the above described crepe facilitating composition subsequent to formation of a wet tissue web and prior to drying of the web to completion will also provide significant benefits and are expressly included within the scope of the present invention.

More preferably, the bonding inhibitor, the carboxymethyl cellulose, and the cationic starch are formed into separate aqueous dispersions and added separately to the aqueous dispersion of papermaking fibers at a suitable point ahead of the sheet forming stage, and the aqueous dispersion of the bonding inhibitor is added to the aqueous dispersion of papermaking fibers before the cationic starch.

Most preferably, the constituents of said crepe facilitating composition are added separately as aqueous dispersions to said aqueous slurry of papermaking fibers prior to depositing the fibers on said foraminous surface, the carboxymethyl cellulose is added to the aqueous slurry before the quaternary ammonium bonding inhibitor, and the quaternary ammonium compound is added prior to the cationic starch.

In the process step of the present invention comprising the depositing of the papermaking fibers on a foraminous surface to form an embryonic web, the scope of the invention also includes the formation of multiple paper layers in which two or more layers of furnish are preferably formed from the deposition of separate streams of dilute fiber slurries. The layers are preferably comprised of different fiber types, the fibers typically being relatively long softwood and relatively short hardwood fibers as used in multi-layered tissue paper making. If the individual layers are initially formed on separate wires, the layers are subsequently combined when wet to form a multi-layered tissue paper web. The papermaking fibers are preferably comprised of different fiber types, the fibers typically being relatively long softwood and relatively short hardwood fibers. More preferably, the hardwood fibers comprise at least about 50% and said softwood fibers comprise at least about 10% of said papermaking fibers.

In the process step of the present invention comprising the transfer of the web to a felt or fabric, the process step of conventionally felt pressing tissue paper, well known in the art, is expressly included within the scope of this invention. In this process step, the web is dewatered by transferring to a dewatering felt and pressing the web so that water is removed from the web into the felt by pressing operations wherein the web is subjected to pressure developed by opposing mechanical members, for example, cylindrical rolls. Because of the substantial pressures needed to de-water the web in this fashion, the resultant webs made by conventional felt pressing are relatively high in density and are characterized by having a uniform density throughout the web structure.

In the process step of the present invention comprising the transfer of the semi-dry web to a Yankee dryer, the web is pressed during transfer to the cylindrical steam drum apparatus known in the art as a Yankee dryer. The transfer is effected by mechanical means such as an opposing cylindrical drum pressing against the web. Vacuum may also be applied to the web as it is pressed against the Yankee surface. Multiple Yankee dryer drums can be employed.

More preferable variations of the processing steps include the so-called pattern densified methods in which the resultant structure is characterized by having a relatively high bulk field of relatively low fiber density and an array of densified zones of relatively high fiber density. The high bulk field is alternatively characterized as a field of pillow regions. The densified zones are alternatively referred to as knuckle regions. The densified zones may be discretely spaced within the high bulk field or may be interconnected, either fully or partially, within the high bulk field. Preferred processes for making pattern densified tissue webs are disclosed in U.S. Pat. No. 3,301,746, issued to Sanford and Sisson on Jan. 31, 1967, U.S. Pat. No. 3,974,025, issued to Peter G. Ayers on Aug. 10, 1976, and U.S. Pat. No. 4,191,609, issued to Paul D. Trokhan on Mar. 4, 1980, and U.S. Pat. No. 4,637,859, issued to Paul D. Trokhan on Jan. 20, 1987, U.S. Pat. No. 4,942,077 issued to Wendt et al. on Jul. 17, 1990, European Patent Publication No. 0 617 164 A1, Hyland et al., published Sep. 28, 1994, European Patent Publication No. 0 616 074 A1, Hermans et al., published Sep. 21, 1994; all of which are incorporated herein by reference.

To form pattern densified webs, the web transfer step immediately after forming the web is to a forming fabric rather than a felt. The web is juxtaposed against an array of supports comprising the forming fabric. The web is pressed against the array of supports, thereby resulting in densified zones in the web at the locations geographically corresponding to the points of contact between the array of supports and the wet web. The remainder of the web not compressed during this operation is referred to as the high bulk field. This high bulk field can be further dedensified by application of fluid pressure, such as with a vacuum type device or a blow-through dryer. The web is dewatered, and optionally predried, in such a manner so as to substantially avoid compression of the high bulk field. This is preferably accomplished by fluid pressure, such as with a vacuum type device or blow-through dryer, or alternately by mechanically pressing the web against an array of supports wherein the high bulk field is not compressed. The operations of dewatering, optional predrying and formation of the densified zones may be integrated or partially integrated to reduce the total number of processing steps performed. The moisture content of the semi-dry web at the point of transfer to the Yankee surface is less than about 40% and the hot air is forced through said semi-dry web while the semi-dry web is on said forming fabric to form a low density structure.

The pattern densified web is transferred to the Yankee dryer and dried to completion, preferably still avoiding mechanical pressing. In the present invention, preferably from about 8% to about 55% of the creped tissue paper surface comprises densified knuckles having a relative density of at least 125% of the density of the high bulk field.

The array of supports is preferably an imprinting carrier fabric having a patterned displacement of knuckles which operate as the array of supports which facilitate the formation of the densified zones upon application of pressure. The pattern of knuckles constitutes the array of supports previously referred to. Imprinting carrier fabrics are disclosed in U.S. Pat. No. 3,301,746, Sanford and Sisson, issued Jan. 31, 1967, U.S. Pat. No. 3,821,068, Salvucci, Jr. et al., issued May 21, 1974, U.S. Pat. No. 3,974,025, Ayers, issued Aug. 10, 1976, U.S. Pat. No. 3,573,164, Friedberg et al., issued Mar. 30, 1971, U.S. Pat. No. 3,473,576, Amneus, issued Oct. 21, 1969, U.S. Pat. No. 4,239,065, Trokhan, issued Dec. 16, 1980, and U.S. Pat. No. 4,528,239, Trokhan, issued Jul. 9, 1985, all of which are incorporated herein by reference.

Most preferably, the embryonic web is caused to conform to the surface of an open mesh drying/imprinting fabric by the application of a fluid force to the web and thereafter thermally predried on said fabric as part of a low density paper making process.

Another variation of the processing steps included within the present invention includes the formation of, so-called uncompacted, nonpattern-densified multi-layered tissue paper structures such as are described in U.S. Pat. No. 3,812,000 issued to Joseph L. Salvucci, Jr. and Peter N. Yiannos on May 21, 1974 and U.S. Pat. No. 4,208,459, issued to Henry E. Becker, Albert L. McConnell, and Richard Schutte on Jun. 17, 1980, both of which are incorporated herein by reference. In general, uncompacted, non pattern densified multi-layered tissue paper structures are prepared by depositing a paper making furnish on a foraminous forming wire such as a Fourdrinier wire to form a wet web, draining the web and removing additional water without mechanical compression until the web has a fiber consistency of at least 80%, and creping the web. Water is removed from the web by vacuum dewatering and thermal drying. The resulting structure is a soft but weak high bulk sheet of relatively uncompacted fibers. Bonding material is preferably applied to portions of the web prior to creping.

In the process step of the present invention comprising the step of removing the essentially dry web from the Yankee dryer by means of a creping blade, it is preferable to minimize the impact angle formed by the creping blade. Such configurations desirably increase the tension in the web as it is drawn off the Yankee. It is believed that the crepe facilitating compositions of the present invention offer the potential to reduce the impact angle without observing the expected increase in frequency of web breaks due to plugging of the doctor blade.

Figure 1:
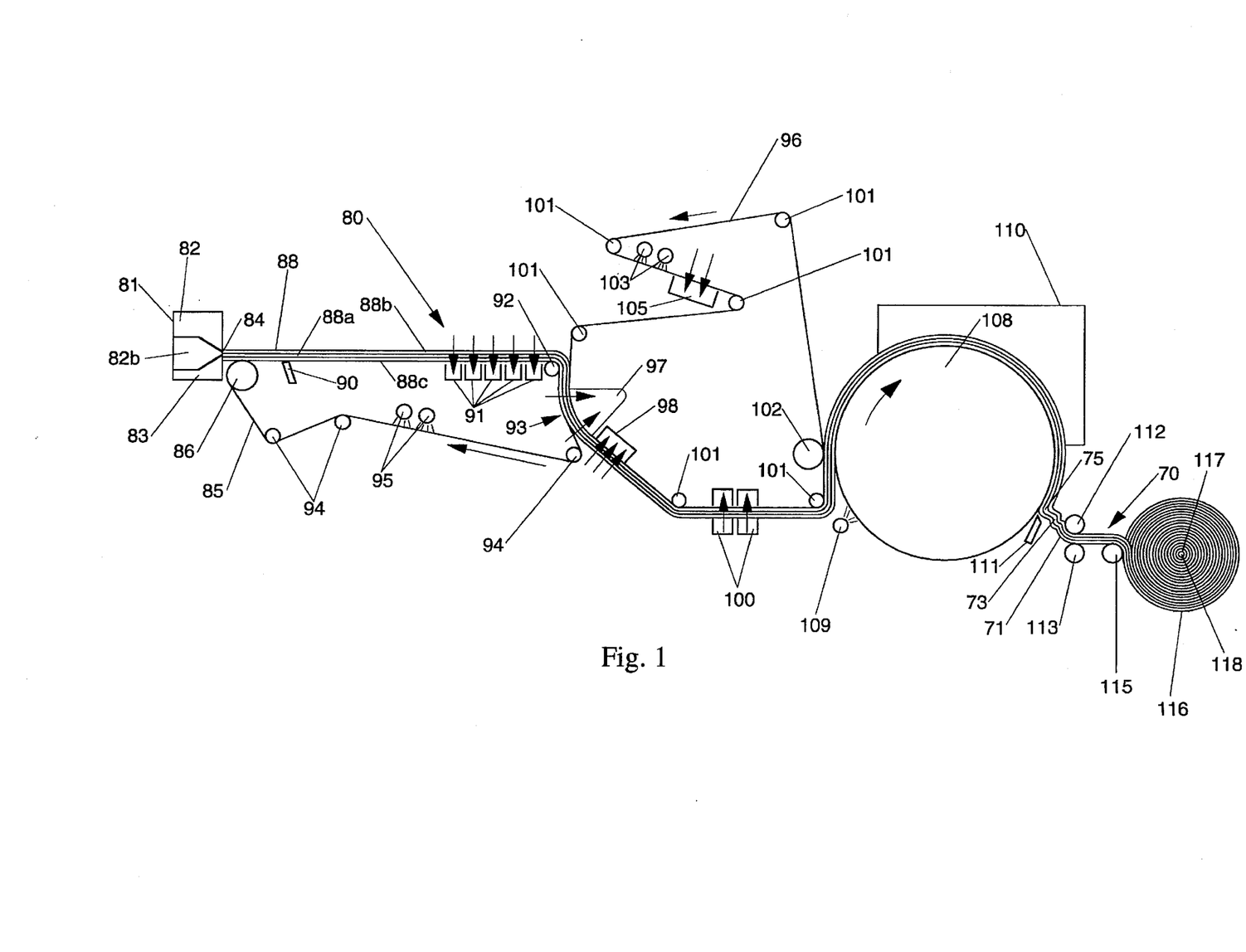
FIG. 1 is a schematic representation illustrating a preferred embodiment of the papermaking process of the present invention for producing a strong and soft creped tissue paper through the use of a crepe facilitating composition.

FIG. 1 is a schematic of representation illustrating a preferred embodiment of the papermaking process of the present invention for producing a strong and soft creped tissue paper through the use of a crepe facilitating composition. This preferred embodiment is described in the following discussion, wherein reference is made to FIG. 1.

FIG. 1 is a side elevational view of a preferred papermaking machine 80 for manufacturing paper according to the present invention. Referring to FIG. 1, papermaking machine 80 comprises a layered headbox 81 having a top chamber 82 a center chamber 82b, and a bottom chamber 83, a slice roof 84, and a Fourdrinier wire 85 which is looped over and about breast roll 86, deflector 90, vacuum suction boxes 91, couch roll 92, and a plurality of turning rolls 94. In operation, one papermaking furnish is pumped through top chamber 82 a second papermaking furnish is pumped through center chamber 82b, while a third furnish is pumped through bottom chamber 83 and thence out of the slice roof 84 in over and under relation onto Fourdrinier wire 85 to form thereon an embryonic web 88 comprising layers 88a, and 88b, and 88c. Dewatering occurs through the Fourdrinier wire 85 and is assisted by deflector 90 and vacuum boxes 91. As the Fourdrinier wire makes its return run in the direction shown by the arrow, showers 95 clean it prior to its commencing another pass over breast roll 86. At web transfer zone 93, the embryonic web 88 is transferred to a foraminous carrier fabric 96 by the action of vacuum transfer box 97. Carrier fabric 96 carries the web from the transfer zone 93 past vacuum dewatering box 98, through blow-through predryers 100 and past two turning rolls 101 after which the web is transferred to a Yankee dryer 108 by the action of pressure roll 102. The carrier fabric 96 is then cleaned and dewatered as it completes its loop by passing over and around additional turning rolls 101, showers 103, and vacuum dewatering box 105. The predried paper web is adhesively secured to the cylindrical surface of Yankee dryer 108 aided by adhesive applied by spray applicator 109. Drying is completed on the steam heated Yankee dryer 108 and by hot air which is heated and circulated through drying hood 110 by means not shown. The web is then dry creped from the Yankee dryer 108 by doctor blade 111 after which it is designated paper sheet 70 comprising a Yankee-side layer 71 a center layer 73, and an off-Yankee-side layer 75. Paper sheet 70 then passes between calendar rolls 112 and 113, about a circumferential portion of reel 115, and thence is wound into a roll 116 on a core 117 disposed on shaft 118.

Still referring to FIG. 1, the genesis of Yankee-side layer 71 of paper sheet 70 is the furnish pumped through bottom chamber 83 of headbox 81, and which furnish is applied directly to the Fourdrinier wire 85 whereupon it becomes layer 88c of embryonic web 88. The genesis of the center layer 73 of paper sheet 70 is the furnish delivered through chamber 82b of headbox 81, and which furnish forms layer 88b on top of layer 88c. The genesis of the off-Yankee-side layer 75 of paper sheet 70 is the furnish delivered through top chamber 82 of headbox 81, and which furnish forms layer 88a on top of layer 88b of embryonic web 88. Although FIG. 1 shows papermachine 80 having headbox 81 adapted to make a three-layer web, headbox 81 may alternatively be adapted to make unlayered, two layer or other multi-layer webs.

Further, with respect to making paper sheet 70 embodying the present invention on papermaking machine 80, FIG. 1, the Fourdrinier wire 85 must be of a fine mesh having relatively small spans with respect to the average lengths of the fibers constituting the short fiber furnish so that good formation will occur; and the foraminous carrier fabric 96 should have a fine mesh having relatively small opening spans with respect to the average lengths of the fibers constituting the long fiber furnish to substantially obviate bulking the fabric side of the embryonic web into the inter-filamentary spaces of the fabric 96. Also, with respect to the process conditions for making exemplary paper sheet 70, the paper web is preferably dried to about 80% fiber consistency, and more preferably to about 95% fiber consistency prior to creping.

Figure 2:
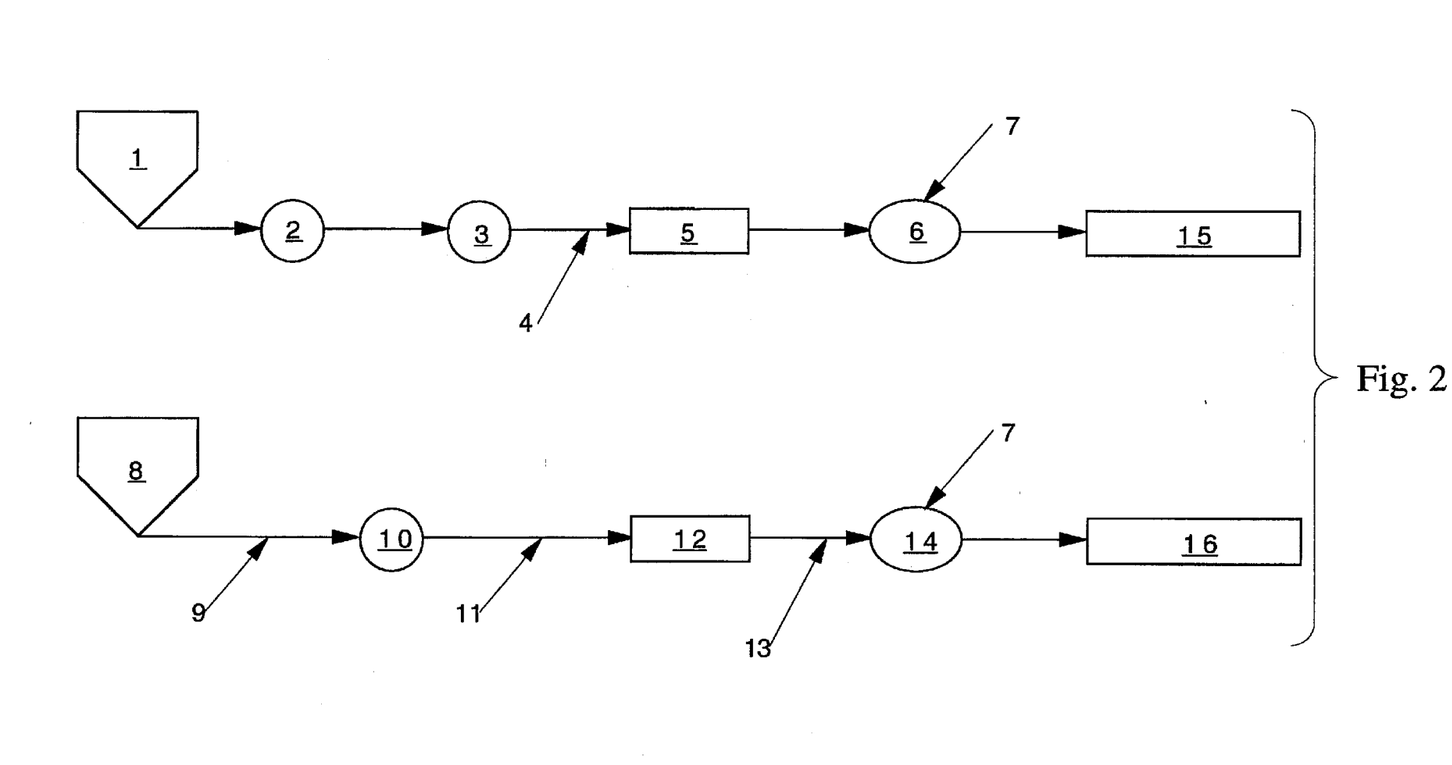
FIG. 2 is a schematic representation illustrating a preferred embodiment of the process steps for incorporating the crepe facilitating composition.

FIG. 2 is a schematic representation illustrating a preferred embodiment for the process step of incorporating the crepe facilitating composition of the present invention. The following discussion, with reference to FIG. 2, describes this preferred embodiment.

A storage vessel 1 is provided for staging an aqueous slurry of relatively long papermaking fibers. The slurry is conveyed by means of a pump 2 and optionally through a refiner 3 to fully develop the strength potential of the long papermaking fibers. Additive pipe 4 conveys a resin to provide for wet or dry strength, as desired in the finished product. The slurry is then further conditioned in mixer 5 to aid in absorption of the resin. The suitably conditioned slurry is then diluted with white water 7 in a fan pump 6 forming a dilute long papermaking fiber slurry 15.

Still referring to FIG. 2, a storage vessel 8 is a repository for a short papermaking fiber slurry. Additive pipe 9 conveys a carboxymethyl cellulose component of the crepe facilitating composition. Pump 10 acts to convey the short papermaking fiber slurry as well as provide for dispersion of the carboxymethyl cellulose. Additive pipe 11 conveys a bonding inhibitor component of the crepe facilitating composition. The slurry is further conditioned in a mixer 12 to aid in absorption of the additives. Additive pipe 13 conveys a cationic starch component of the crepe facilitating composition. The suitably conditioned slurry is diluted with white water 7 at the suction of a fan pump 14 to provide for dilute short papermaking fiber slurry 16.

Preferably, the short papermaking fiber slurry 16 from FIG. 2 is directed to the preferred papermaking process illustrated in FIG. 1 and is divided into two approximately equal streams which are then directed into headbox chambers 82 and 83 ultimately evolving into off-Yankee-side-layer 75 and Yankee-side-layer 71, respectively of the strong, soft creped tissue paper. Similarly, the long papermaking fiber slurry 15, referring to FIG. 2, is preferably directed into headbox chamber 82b ultimately evolving into center layer 73 of the strong, soft creped tissue paper.

The advantages realized through the practice of the present invention include:

a) The percent crepe can be reduced without producing the usual operational difficulties or degradation of web softness which would exist without the features of the invention; and b) The benefits are gained without expense of losing strength of the web or adhesion to the Yankee dryer.

Without wishing to be bound by theory, or to otherwise limit the present invention, the following discussion is offered for explaining how the addition of the crepe facilitating composition functions to allow these benefits. It is believed that the bonding inhibitor prevents the formation of relatively rigid hydrogen bonds. The ionic character of the carboxymethyl cellulose and cationic starch rebuilds the bonding in an alternate form, an array of higher energy but less frequent bonds. The result is a web with lower stiffness as a function of its ultimate strength. As a result, when the papermaker attempts to apply tension to the web to convey it to the wind-up reel, he/she must operate at a higher winding reel speed to induce a given tension in the web. The result is a lower percent (%) crepe without the usual operating disadvantages which would occur with such a move.

Other Additives

Other materials can be added to the papermaking furnish or the embryonic web to impart other characteristics to the product or improve the process so long as they do not significantly and adversely affect the softness or improved creping efficiency aspects of the present invention. The following materials are expressly included, but their inclusion is not offered to be all-inclusive. Other materials can be included as well so long as they do not interfere or counteract the advantages of the present invention.

If permanent wet strength is desired, the group of chemicals: including polyamide-epichlorohydrin, polyacrylamides, styrene-butadiene latexes; insolubilized polyvinyl alcohol; urea-formaldehyde; polyethyleneimine; chitosan polymers and mixtures thereof can be added to the papermaking furnish or to the embryonic web. Polyamide-epichlorohydrin resins are cationic wet strength resins which have been found to be of particular utility. Suitable types of such resins are described in U.S. Pat. Nos. 3,700,623, issued on Oct. 24, 1972, and 3,772,076, issued on Nov. 13, 1973, both issued to Keim and both being hereby incorporated by reference. One commercial source of a useful polyamide-epichlorohydrin resins is Hercules, Inc. of Wilmington, Del., which markets such resin under the mark Kymeme® 557H.

Papermaking retention aids are used to increase the retention of the fine furnish solids in the web during the papermaking process. Without adequate retention of the fine solids, they are either lost to the process effluent or accumulate to excessively high concentrations in the recirculating white water loop and cause production difficulties including deposit build-up and impaired drainage. The use of such resins in combination with the creping facilitating composition is expressly included within the scope of the present invention. One commercial source of polyacrylamide resin retention aid is Hercules, Inc. of Wilmington, Del., which markets one such resin under the marks Reten® 1232.

Many creped paper products must have limited strength when wet because of the need to dispose of them through toilets into septic or sewer systems. If wet strength is imparted to these products, it is preferred to be fugitive wet strength characterized by a decay of part or all of its potency upon standing in presence of water. If fugitive wet strength is desired, the binder materials can be chosen from the group consisting of dialdehyde starch or other resins with aldehyde functionality such as Co-Bond 1000® offered by National Starch and Chemical Company, Parez 750® offered by Cytec of Stamford, Conn. and the resin described in U.S. Pat. No. 4,981,557 issued on Jan. 1, 1991, to Bjorkquist and incorporated herein by reference.

If enhanced absorbency is needed, surfactants may be used to treat the creped tissue paper webs of the present invention. The level of surfactant, if used, is preferably from about 0.01% to about 2.0% by weight, based on the dry fiber weight of the tissue paper. The surfactants preferably have alkyl chains with eight or more carbon atoms. Exemplary anionic surfactants are linear alkyl sulfonates, and alkylbenzene sulfonates. Exemplary nonionic surfactants are alkylglycosides including alkylglycoside esters such as Crodesta SL-40 which is available from Croda, Inc. (New York, N.Y.); alkylglycoside ethers as described in U.S. Pat. No. 4,011,389, issued to W. K. Langdon, et al. on Mar. 8, 1977; and alkylpolyethoxylated esters such as Pegosperse 200 ML available from Glyco Chemicals, Inc. (Greenwich, Conn.) and IGEPAL RC-520 available from Rhone Poulenc Corporation (Cranbury, N.J.).

The present invention can also be used in conjunction with adhesives and coatings designed to be sprayed onto the surface of the web or onto the Yankee dryer, such products designed for controlling adhesion to the Yankee dryer. For example, U.S. Pat. No. 3,926,716, Bates, incorporated here by reference, discloses a process using an aqueous dispersion of polyvinyl alcohol of certain degree of hydrolysis and viscosity for improving the adhesion of paper webs to Yankee dryers. Such polyvinyl alcohols, sold under the tradename Airvol® by Air Products and Chemicals, Inc. of Allentown, Pa. can be used in conjunction with the present invention. Other Yankee coatings similarly recommended for use directly on the Yankee or on the surface of the sheet are cationic polyamide or polyamine resins such as those made under the tradename Rezosol® and Unisoft® by Houghton International of Valley Forge, Pa. and the Crepetrol® tradename by Hercules, Inc. of Wilmington, Del. These can also be used with the present invention. While not being bound by theory, it is believed that spray-on adhesive products act primarily as web adhesion modifiers, while the crepe facilitating composition of the present invention acts as a web cohesion modifier; therefore, the use of a suitable Yankee adhesive will often complement rather than compete with the performance of the internal crepe facilitating composition disclosed herein.

Preferably the web is secured to the Yankee dryer by means of an adhesive selected from the group consisting of partially hydrolyzed polyvinyl alcohol resin, polyamide resin, polyamine resin, mineral oil, and mixtures thereof. More preferably, the adhesive is selected from the group consisting of polyamide epichlorhydrin resin, mineral oil, and mixtures thereof.

The above listings of optional chemical additives is intended to be merely exemplary in nature, and are not meant to limit the scope of the invention.

The multi-layered tissue paper web of this invention can be used in any application where soft, absorbent multi-layered tissue paper webs are required. Particularly advantageous uses of the multi-layered tissue paper web of this invention are in toilet tissue and facial tissue products.

Analytical and Testing Procedures

Quantitative techniques to determine the constituent of the crepe facilitating compounds present in webs of the present invention are available in the applicable art, and any acceptable method can be applied.

A. Density

The density of multi-layered tissue paper, as that term is used herein, is the average density calculated as the basis weight of that paper divided by the caliper, with the appropriate unit conversions incorporated therein. Caliper of the multi-layered tissue paper, as used herein, is the thickness of the paper when subjected to a compressive load of 95 g/in$^2$ (15.5 g/cm$^2$).

B. Molecular Weight Determination

The essential distinguishing characteristic of polymeric materials is their molecular size. The properties which have enabled polymers to be used in a diversity of applications derive almost entirely from their macromolecular nature. In order to characterize fully these materials it is essential to have some means of defining and determining their molecular weights and molecular weight distributions. It is more correct to use the term relative molecular mass rather the molecular weight, but the latter is used more generally in polymer technology. It is not always practical to determine molecular weight distributions. However, this is becoming more common practice using chromatographic techniques. Rather, recourse is made to expressing molecular size in terms of molecular weight averages.

Molecular weight averages

If we consider a simple molecular weight distribution which represents the weight fraction ($w_i$) of molecules having relative molecular mass ($M_i$), it is possible to define several useful average values. Averaging carried out on the basis of the number of molecules ($N_i$) of a particular size ($M_i$) gives the Number Average Molecular Weight $$\overline{M}_n = \frac{\Sigma N_i M_i}{\Sigma N_i}$$

An important consequence of this definition is that the Number Average Molecular Weight in grams contains Avogadro's Number of molecules. This definition of molecular weight is consistent with that of monodisperse molecular species, i.e. molecules having the same molecular weight. Of more significance is the recognition that if the number of molecules in a given mass of a polydisperse polymer can be determined in some way then $\overline{M}_n$, can be calculated readily. This is the basis of colligative property measurements.

Averaging on the basis of the weight fractions ($W_i$) of molecules of a given mass ($M_i$) leads to the definition of Weight Average Molecular Weights $$\overline{M}_w = \frac{\Sigma W_i N_i}{\Sigma W_i} = \frac{\Sigma N_i M_i^2}{\Sigma N_i M_i}$$

$\overline{M}_w$ is a more useful means for expressing polymer molecular weights than $\overline{M}_n$ since it reflects more accurately such properties as melt viscosity and mechanical properties of polymers and is therefor used in the present invention.

C. Quantitative analysis for quaternary ammonium compound

For example, the level of the quaternary ammonium compound, such as Di(Hydrogenated)Tallow DiMethyl Ammonium Chloride (DHTDMAC), retained by the tissue paper can be determined by solvent extraction of the DHTDMAC by an organic solvent followed by an anionic/cationic titration using Dimidium Bromide as indicator.

These methods are exemplary, and are not meant to exclude other methods which may be useful for determining levels of particular components retained by the tissue paper.

The following examples illustrate the practice of the present invention but are not intended to be limiting thereof.

EXAMPLES

The purpose of these examples is to illustrate the advantages of the present invention for efficiently producing strong and soft creped tissue paper. For this illustration, a pilot scale Fourdrinier papermaking machine is used to make creped tissue paper both with and without incorporating the features of the present invention.

EXAMPLE 1

This Example illustrates a process incorporating a preferred embodiment of the present invention using the pilot scale Fourdrinier. An aqueous slurry of NSK of about 3% consistency is made up using a conventional pulper and is passed through a stock pipe toward the headbox of the Fourdrinier.

In order to impart a temporary wet strength to the finished product, a 1% dispersion of National Starch Co-BOND 1000® is prepared and is added to the NSK stock pipe at a rate sufficient to deliver 1% Co-BOND 1000® based on the dry weight of the NSK fibers. The absorption of the temporary wet strength resin is enhanced by passing the treated slurry through an in-line mixer.

The NSK slurry is diluted with white water to about 0.2% consistency at the fan pump.

An aqueous slurry of eucalyptus fibers of about 3% by weight is made up using a conventional repulper.

The eucalyptus is passed through a stock pipe where the constituents of the crepe facilitating composition are added.

The carboxymethyl cellulose is added first. The carboxymethyl cellulose is first dissolved in water and diluted to a solution strength of 1% by weight. Hercules CMC-7MT® is used to make-up the CMC solution. The aqueous solution of CMC is added to the aqueous slurry of eucalyptus fibers at a rate of 0.25% CMC by weight based on the dry weight of the eucalyptus fibers. The aqueous slurry of eucalyptus fibers passes through a centrifugal stock pump to aid in distributing the CMC.

The bonding inhibitor composition is added next. The bonding inhibitor composition is DiTallow DiMethyl Ammonium Methyl Sulfate (DTDMAMS). Pre-heated DTDMAMS (170° F.) is first slurried in water conditioned by pre-heating to 170° F. The water is agitated during addition of the DTDMAMS to aid in its dispersion. The concentration of the resultant DTDMAMS dispersion is 1% by weight, and it is added to the eucalyptus stock pipe at a rate of 0.375% by weight DTDMAMS based on the dry weight of the eucalyptus fibers. The absorption of the DTDMAMS onto the eucalyptus is enhanced by passing the slurry thorough an in-line mixer.

Cationic starch is added next. RediBOND 5320®, a pre-dispersed form of waxy maize corn starch is used. The starch dispersion is first diluted to a concentration of 1% solids and it is added to the traveling eucalyptus fiber slurry at a rate of 0.625% by weight cationic starch based on the dry weight of the eucalyptus fibers.

The eucalyptus slurry passes to the second fan pump where it is diluted with white water to a consistency of about 0.2%.

The slurries of NSK and eucalyptus are directed into a multi-channeled headbox suitably equipped with layering leaves to maintain the streams as separate layers until discharge onto a traveling Fourddnier wire. A three-chambered headbox is used. The eucalyptus slurry containing 80% of the dry weight of the ultimate paper is directed to chambers leading to each of the two outer layers, while the NSK slurry comprising 20% of the dry weight of the ultimate paper is directed to a chamber leading to a layer between the two eucalyptus layers. The NSK and eucalyptus slurries are combined at the discharge of the headbox into a composite slurry.

The composite slurry is discharged onto the traveling Fourdrinier wire and is dewatered assisted by a deflector and vacuum boxes.

The embryonic wet web is transferred from the Fourdrinier wire, at a fiber consistency of about 15% at the point of transfer, to a patterned forming fabric of a 5-shed, satin weave configuration having 84 machine-direction and 76 cross-machine-direction monofilaments per inch, respectively, and about 36% knuckle area.

Further de-watering is accomplished by vacuum assisted drainage until the web has a fiber consistency of about 28%.

While remaining in contact with the patterned forming fabric, the patterned web is pre-dried by air blow-through to a fiber consistency of about 62% by weight.

The semi-dry web is then adhered to the surface of a Yankee dryer with a sprayed creping adhesive comprising a 0.125% aqueous solution of polyvinyl alcohol. The creping adhesive is delivered to the Yankee surface at a rate of 0.1% adhesive solids based on the dry weight of the web.

The fiber consistency is increased to about 96% before the web is dry creped from the Yankee with a doctor blade.

The doctor blade has a bevel angle of about 20 degrees and is positioned with respect to the Yankee dryer to provide an impact angle of about 76 degrees.

The percent crepe is adjusted to about 12% by operating the Yankee dryer at about 800 fpm (feet per minute) (about 244 meters per minute), while the dry web is formed into roll at a speed of 704 fpm (216 meters per minutes).

The web is converted into a three-layer, single-ply creped patterned densified tissue paper product of about 18 lb per 3000 ft$^2$ basis weight.

Comparative Example 1

This comparative Example, illustrates a reference process not incorporating the features of the present invention. This process is illustrated in the following steps:

First, an aqueous slurry of NSK of about 3% consistency is made up using a conventional pulper and is passed through a stock pipe toward the headbox of the Fourdrinier.

In order to impart a temporary wet strength to the finished product, a 1% dispersion of National Starch Co-BOND 1000® is prepared and is added to the NSK stock pipe at a rate sufficient to deliver 1% Co-BOND 1000® based on the dry weight of the NSK fibers. The absorption of the temporary wet strength resin is enhanced by passing the treated slurry through an in-line mixer.

The NSK slurry is diluted with white water to about 0.2% consistency at the fan pump.

An aqueous slurry of eucalyptus fibers of about 3% by weight is made up using a conventional repulper.

The eucalyptus is passed through a stock pipe to another fan pump where it is diluted with white water to a consistency of about 0.2%.

The slurries of NSK and eucalyptus are directed into a multi-channeled headbox suitably equipped with layering leaves to maintain the streams as separate layers until discharge onto a traveling Fourdrinier wire. A three-chambered headbox is used. The eucalyptus slurry containing 80% of the dry weight of the ultimate paper is directed to chambers leading to each of the two outer layers, while the NSK slurry comprising 20% of the dry weight of the ultimate paper is directed to a chamber leading to a layer between the two eucalyptus layers. The NSK and eucalyptus slurries are combined at the discharge of the headbox into a composite slurry.

The composite slurry is discharged onto the traveling Fourdrinier wire and is dewatered assisted by a deflector and vacuum boxes.

The embryonic wet web is transferred from the Fourdrinier wire, at a fiber consistency of about 15% at the point of transfer, to a patterned forming fabric of a 5-shed, satin weave configuration having 84 machine-direction and 76 cross-machine-direction monofilaments per inch, respectively, and about 36% knuckle area.

Further de-watering is accomplished by vacuum assisted drainage until the web has a fiber consistency of about 28%.

While remaining in contact with the patterned forming fabric, the patterned web is pre-dried by air blow-through to a fiber consistency of about 62% by weight.

The semi-dry web is then adhered to the surface of a Yankee dryer with a sprayed creping adhesive comprising a 0.125% aqueous solution of polyvinyl alcohol. The creping adhesive is delivered to the Yankee surface at a rate of 0.1% adhesive solids based on the dry weight of the web.

The fiber consistency is increased to about 96% before the web is dry creped from the Yankee with a doctor blade.

The doctor blade has a bevel angle of about 25 degrees and is positioned with respect to the Yankee dryer to provide an impact angle of about 81 degrees.

The percent crepe is adjusted to about 18% by operating the Yankee dryer at about 800 fpm (feet per minute) (about 244 meters per minute), while the dry web is formed into roll at a speed of 656 fpm (201 meters per minutes).

The web is converted into a three-layer, single-ply creped patterned densified tissue paper product of about 18 lb per 3000 ft² basis weight.

Both Example 1 and Comparative Example 1 yield web tension in an acceptable range to prevent weaving a fluttering of the web from low tension or snapping from high tension. Confirming the benefits of the Example 1 product and process versus those of Comparative Example 1, the Example 1 web was produced at a winding speed 6% faster and is judged softer by a panel of expert judges.

What is claimed is:

1. A soft creped tissue paper comprising:
   a) papermaking fibers; and
   b) a crepe facilitating composition comprising:
      i) from about 0.02% to about 1.0% by weight, of a bonding inhibitor, based on the dry weight of the papermaking fibers;
      ii) from about 0.02% to about 0.5% by weight, of a water soluble carboxymethyl cellulose, based on the dry weight of the papermaking fibers; and
      iii) from about 0.05% to about 3.0% by weight, of a cationic starch based on the dry weight of the papermaking fibers,
   wherein said bonding inhibitor is present in a weight ratio relative to the carboxymethyl cellulose of about 1:5 to about 5:1 and wherein said bonding inhibitor is a quaternary ammonium compound.

2. The tissue paper of claim 1 wherein said papermaking fibers comprise a blend of hardwood fibers and softwood fibers, said hardwood fibers comprising at least about 50% and said softwood fibers comprising at least about 10% of said papermaking fibers.

3. The tissue paper of claim 2 wherein said tissue paper comprises at least two superposed layers, an inner layer and at least one outer layer contiguous with said inner layer.

4. The tissue paper of claim 3 wherein said tissue paper comprises three superposed layers, an inner layer and two outer layers, said inner layer being located between two said outer layers.

5. The tissue paper of claim 4 wherein said inner layer comprises softwood fibers having an average length greater than at least about 2.0 mm, and said outer layers comprise hardwood fibers having an average length less than about 1.0 mm.

6. The tissue paper of claim 5 wherein the softwood fibers comprise northern softwood Kraft fibers and the hardwood fibers comprise eucalyptus Kraft fibers.

7. The tissue paper of claim 6 wherein the crepe facilitating composition is contained in at least one of said outer layers.

8. The tissue paper of claim 7 wherein the crepe facilitating composition is contained in both of said outer layers.

9. The tissue paper of claim 1 wherein said creped tissue paper is pattern densified paper.

10. The tissue paper of claim 1 wherein the carboxymethyl cellulose has a molecular weight ranging from about 90,000 to about 700,000.

11. The tissue paper of claim 10 wherein the carboxymethyl cellulose has a degree of substitution ranging from about 0.3 to about 1.4.

12. The tissue paper of claim 1 wherein the cationic starch has a degree of substitution ranging from about 0.01 to about 0.1.

13. The tissue paper of claim 12 wherein the cationic starch is derived from waxy maize.

14. The tissue paper of claim 1 wherein the quaternary ammonium compound has the formula:

wherein m is 1 to 3;

each $R_1$ is a $C_1$–$C_8$ alkyl group, hydroxyalkyl group, hydrocarbyl or substituted hydrocarbyl group, alkoxylated group, benzyl group, or mixtures thereof;

each $R_2$ is a $C_9$–$C_{41}$ alkyl group, hydroxyalkyl group, hydrocarbyl or substituted hydrocarbyl group, alkoxylated group, benzyl group, or mixtures thereof; and $X^-$ is any softener-compatible anion.

15. The tissue paper of claim 14 wherein each $R_1$ is selected from $C_1$–$C_3$ alkyl and each $R_2$ is selected from $C_{16}$–$C_{18}$ alkyl.

16. The tissue paper of claim 15 wherein each $R_1$ is methyl and $X^-$ is chloride or methyl sulfate.

17. The tissue paper of claim 16 wherein the quaternary ammonium compound is di(hydrogenated)tallow dimethyl ammonium chloride.

18. The tissue paper of claim 16 wherein the quaternary ammonium compound is di(hydrogenated)tallow dimethyl ammonium methyl sulfate.

19. The tissue paper of claim 14 wherein the $R_2$ substituent is derived from vegetable oil sources.

20. The tissue paper of claim 1 wherein said bonding inhibitor is present in a ratio relative to the carboxymethyl cellulose of about 1:2 to about 2:1.

21. A process of making a creped tissue paper comprising the steps of:
   a) forming an aqueous slurry of paper making fibers;
   b) adding a crepe facilitating composition comprising:
      i) from about 0.02% to about 1.0% by weight, of a bonding inhibitor, based on the dry weight of the papermaking fibers, wherein said bonding inhibitor is a quaternary ammonium compound;
      ii) from about 0.02% to about 0.5% by weight, of a water soluble carboxymethyl cellulose, based on the dry weight of the papermaking fibers; and
      iii) from about 0.05% to about 3.0% by weight, of a cationic starch, based on the dry weight of the papermaking fibers;
   wherein said bonding inhibitor is present in a ratio relative to the carboxymethyl cellulose of about 1:5 to about 5:1;
   c) depositing the papermaking fibers on a foraminous surface so that the excess water used to form the slurry is removed forming an embryonic web;
   d) transferring the embryonic web to a carrier surface upon which the water removal continues forming a semi-dry web, said carrier surface being selected from the group consisting of papermaking felts and forming fabrics;

e) transferring the semi-dry web and securing it to the surface of a Yankee dryer upon which the drying is continued until the web reaches a substantially dry condition;

f) removing the dried web from the Yankee dryer by means of a creping blade; and g) winding the creped web on a reel.

22. The process of claim 21 wherein the constituents of said crepe facilitating composition are added separately as aqueous dispersions to said aqueous slurry of papermaking fibers prior to depositing the fibers on said foraminous surface.

23. The process of claim 22 wherein the quaternary ammonium compound is added prior to the cationic starch.

24. The process of claim 23 wherein the carboxymethyl cellulose is added to said aqueous slurry before the quaternary ammonium bonding inhibitor.

25. The process of claim 21 wherein said carrier surface is a forming fabric such that said tissue paper is pattern densified.

26. The process of claim 25 wherein the moisture content of the semi-dry web at the point of transfer to the Yankee surface is less than about 40%.

27. The process of claim 26 wherein hot air is forced through said semi-dry web while the semi-dry web is on said forming fabric to form a low density structure.

28. The process of claim 21 wherein said web is secured to the Yankee dryer by means of an adhesive selected from the group consisting of partially hydrolyzed polyvinyl alcohol resin, polyamide resin, polyamine resin, polyamide epichlorohydrin resin, mineral oil, and mixtures thereof.

29. The process of claim 28 wherein said adhesive is selected from the group consisting of polyamide epichlorohydrin resin, mineral oil, and mixtures thereof.

* * * * *